(12) United States Patent
Rohlfing et al.

(10) Patent No.: US 6,554,441 B2
(45) Date of Patent: Apr. 29, 2003

(54) LIGHTING INSTALLATION, IN PARTICULAR AS A DANGER LIGHT, AND WIND ROTOR INSTALLATION WITH LIGHTING INSTALLATION

(75) Inventors: Ralph Rohlfing, Weyhe (DE); Wolfgang Serfass, Bremen (DE)

(73) Assignee: aqua signal Aktiengesellschaft Spezialleuchtenfabrik, Bremen (DE)

( * ) Notice: Subject to any disclaimer, the term of this patent is extended or adjusted under 35 U.S.C. 154(b) by 0 days.

(21) Appl. No.: 10/021,634

(22) Filed: Dec. 12, 2001

(65) Prior Publication Data
US 2003/0043585 A1 Mar. 6, 2003

Related U.S. Application Data

(63) Continuation-in-part of application No. 09/946,106, filed on Sep. 4, 2001.

(30) Foreign Application Priority Data

Aug. 31, 2001 (DE) .......................................... 201 14 306

(51) Int. Cl.⁷ .............................................. B64D 47/06
(52) U.S. Cl. ...................... 362/35; 362/282; 362/216; 362/302; 362/340; 362/981
(58) Field of Search .......................... 362/35, 277, 282, 362/322, 323, 343, 216, 800, 545, 298, 302; 340/981, 983

(56) References Cited

U.S. PATENT DOCUMENTS

| | | | | |
|---|---|---|---|---|
| 3,596,237 A | * | 7/1971 | Barber et al. ............... | 313/594 |
| 5,293,304 A | * | 3/1994 | Godfrey ....................... | 315/315 |
| 5,446,277 A | * | 8/1995 | Rutter ..................... | 250/214 R |
| 5,929,788 A | * | 7/1999 | Vukosic ...................... | 340/471 |
| 6,278,382 B1 | * | 8/2001 | DeMarco et al. ............. | 315/65 |

FOREIGN PATENT DOCUMENTS

| | | |
|---|---|---|
| CH | 185517 | 10/1936 |
| DE | 850 731 | 9/1952 |
| DE | 1 566 856 | 4/1970 |
| DE | 76 26 398 | 2/1977 |
| DE | 97 09 185.2 U1 | 11/1987 |
| DE | 41 17 289 C2 | 12/1992 |
| DE | 197 43 826 A1 | 4/1999 |
| DE | 199 44 533 A1 | 4/2001 |
| GB | 2 358 240 A | 7/2001 |
| JP | 404073802 * | 3/1992 |

* cited by examiner

Primary Examiner—Sandra O'Shea
Assistant Examiner—Hargobind S. Sawhney
(74) Attorney, Agent, or Firm—Technoprop Colton LLC

(57) ABSTRACT

The invention relates to a lighting installation, in particular as a danger light, obstruction light or day and night marker, having at least one luminaire, with at least one lighting means (13) being arranged in a housing. According to the invention, the lighting means (13) is annular or semi-annular in design and defines a ring axis (19). Furthermore, the lighting means (13) is assigned at least one reflector surface (11) which encircles an axis of rotation (21) entirely or in part. Finally, ring axis and axis of rotation run essentially parallel or even coaxial to one another.

18 Claims, 10 Drawing Sheets

LIGHTING INSTALLATION, IN PARTICULAR AS A DANGER LIGHT, AND WIND ROTOR INSTALLATION WITH LIGHTING INSTALLATION

This application is a continuation-in-part of Ser. No. 09/946,106, filed Sep. 4, 2001.

BACKGROUND OF THE INVENTION

1. Technical Field

The invention relates to a lighting installation, in particular as a danger light, obstruction light or daytime and nighttime marker, having at least one luminaire, with at least one lighting means being arranged in a housing. The lighting installations in this case are preferably for aviation obstructions, offshore installations or landing strips, for example wind rotors, multi-story buildings, viaducts, towers, drilling platforms or helipads.

2. Prior Art

Such lighting installations are intended to be visible from as far away as possible. At the same time, it is also possible for certain regions to remain blanked out. It is thus the case, for example, that luminaires on aviation obstructions only have to be visible to aircraft, but not for individuals beneath the aircraft obstructions. These individuals would be dazzled by the light emitted. But apart from this, it is intended for the light to be emitted, as far as possible, in all the cardinal-point directions.

BRIEF SUMMARY OF THE INVENTION

The object of the present invention is to provide a lighting installation which emits powerful light on all sides. For this purpose, the lighting installation according to the invention is defined by the following features:

a) the lighting means is in the form of a ring or part of a ring and defines a ring axis, b) the lighting means is assigned at least a first, wholly or partially encircling reflector surface, which defines an axis of rotation, c) the ring axis and axis of rotation run essentially parallel to one another or even coaxially with one another.

The abovementioned axes are preferably arranged vertically (perpendicular to the earth's surface). Correspondingly, the light is emitted mainly at an angle to the abovementioned axes, in particular above a radial plane. As little light as possible should be emitted in the directions below the radial plane.

The lighting installation is preferably designed as a flashing-light installation, with the luminaire in the form of a flashing luminaire and the lighting means in the form of a flashing lighting means. It is also then usually the case that an external or internal electronic circuit is provided for activating the flashing lighting means.

The reflector surface may be of concave form in relation to the lighting means. Particularly advantageous is a parabolic cross section—even partly parabolic—when looking at a section parallel to the axis of rotation and tangent thereto. This makes it possible to achieve a particularly good concentration of light.

The lighting means is preferably arranged at a focal point of the at least partially parabolic first reflector surface. Since an annular circumferential lighting means is provided and since the reflector surface also assumes a corresponding circumferential configuration, any number of successive focal points are generated in the circumferential direction, thus forming a circumferential focal line. The focal point can also be defined by a portion of the first reflector surface, such as when the first reflector surface is only partially parabolic.

The first reflector surface and the lighting means are configured and arranged such that light is emitted only into a space preferably above a line running through the lighting means and perpendicular to the axis of rotation. By rotation of the perpendicular line about the axis of rotation, a plane of rotation, preferably a plane of lighting, is set up. The light is meant to enter the space only above the plane of rotation. By arranging the lighting installation at a distance from the earth's surface, such as on a tower or the like, the light is then only visible to air traffic but not to people on the ground.

Preferably the first reflector surface is arranged essentially below the lighting means, with an outer circumferential border of the first reflector surface lying in a rotation plane known as the border plane, which intersects the lighting means or runs slightly outside of the lighting means. Preferred in this respect is an arrangement of the first reflector surface relative to the lighting means such that the border plane runs along an top side of the lighting means. The "top side" of the lighting means results from an upright (vertical) arrangement of the axis of rotation. The said circulating border of the first reflector surface represents a transition to non-reflecting regions or a circumferential edge.

The first reflector surface has an inner circumferential border which runs near to a second border plane defined as a rotation plane at an underside of the lighting means. This second border plane can also run along the underside of the lighting means or through the lighting means.

A second reflector surface is also preferably provided which lies opposite the first reflector surface relative to the lighting means. The annular circumferential lighting means defines a (centered) lighting-means plane. The first reflector surface lies essentially on one side of the lighting-means plane and the second reflection plane lies essentially on the other side of the lighting-means plane. Slight overlaps of the lighting-means plane should not be excluded.

The second reflector surface can also have a configuration which is at least partially parabolic as the first reflector surface. This is preferably an embodiment whereby the form is represented at least by parts of the two reflector surfaces as mutually opposite branches. The parabola axis runs preferably through the lighting means and is angled with respect to the center plane of the lighting means in such a way that imaginary and infinite extensions of the two parabola branches run above center plane of illumination.

According to a further idea of the invention, the second reflector surface has an essentially poorer reflecting surface compared to the first reflector surface. Preferably the first reflector surface is metal-coated and the second reflector surface is blackened. The objective is to achieve the best possible reflection on the first reflector surface. The second reflector surface should reflect as little as possible. Inasmuch as a fraction of the light is nevertheless reflected, this fraction should be reflected in a targeted direction.

In an advantageous development the lighting means can be adjusted relative to the first reflector surface and parallel to the ring axis or axis of rotation. This makes it possible to quickly compensate for tolerances in production. In this way it is also possible to set an angle of radiation lying close to a horizontal plane.

The preferred lighting means is an annular xenon flash lamp. Other types of annular lighting means are also applicable. As an alternative, a plurality of LED lamps can be arranged in an annular row, thus forming an annular (or partially annular) lighting means.

In an advantageous embodiment of the invention, a circumferential, cylindrical and transparent covering is provided which is arranged as closely as possible to an outer circumferential border of the first reflector surface. Inasmuch as a second reflector surface is provided, the covering should also be arranged as close to it as possible without any intervening distance. The covering has a circumferential wall which extends parallel to the axis of rotation. A distance of a few mm between the wall and the reflector surface is not detrimental. The narrower the distance between the wall of the covering and the reflector surfaces, the lower the amount of light scatter that is emitted from the luminaire.

The covering advantageously has refracting elements at least in a circumferential section. These may be configured as prismatic and/or catadioptic rings, for example. The objective is to deflect light beams coming directly from the lighting means to a direction as perpendicular as possible to the axis of rotation, or ring axis, or somewhat above the plane perpendicular to it, i.e. above a horizontal direction.

A further idea of the invention provides for a circumferential conical transparent covering with a circumferential main wall, whose diameter increases in the direction of the lighting means, and having a shoulder, connected to the inside of the main wall at the point of its largest diameter, which extends in the direction of the first reflector surface. The shoulder is preferably configured as a continuation of the most outer tangent to the first reflector surface.

According to another idea of the invention, a second reflector surface is provided with diaphragms which prevent the reflected light from being radiated in a direction perpendicular to the axis of rotation. The second reflector surface, either by itself or in conjunction with the screens, has the function of a light trap. This further reduces any light scatter.

Advantageously the light emitted by the lighting means falls on the first reflector surface, is sent directly from the luminaire or strikes other parts of the luminaire's housing, with said other parts having means for averting a reflection of the light. For example, such means may be screens, control rings or especially poorly-reflecting surface coatings, such as blackened surfaces. The objective here is also to avoid light scatter beyond the luminaire.

A further idea of the invention provides for a support on which the first reflector, a board for accommodating electric components, and a board housing are mounted. The support can be an integral part, centered and running along the axis or rotation or the ring axis, into which the specified components are inserted and secured. Preferably the second reflector surface is also held on the support immediately following the first reflector surface.

The preferred field of application of the lighting installation is a wind-rotor installation. The latter is well-known, comprising a high mast on whose peak a hub with a wind-rotor is mounted. A lighting installation is usually arranged at the very top of the mast. For very high masts the lighting installation takes the form of a flashing light, for shorter masts a blinking light is used. The invention also relates to both of these lighting means.

BRIEF DESCRIPTION OF THE DRAWINGS

Further features of the invention are disclosed in the claims and in the description. Exemplary embodiments of the invention are described in more detail below with the help of drawings, which show:

DETAILED DESCRIPTION OF THE PREFERRED EMBODIMENTS

Figure 1:
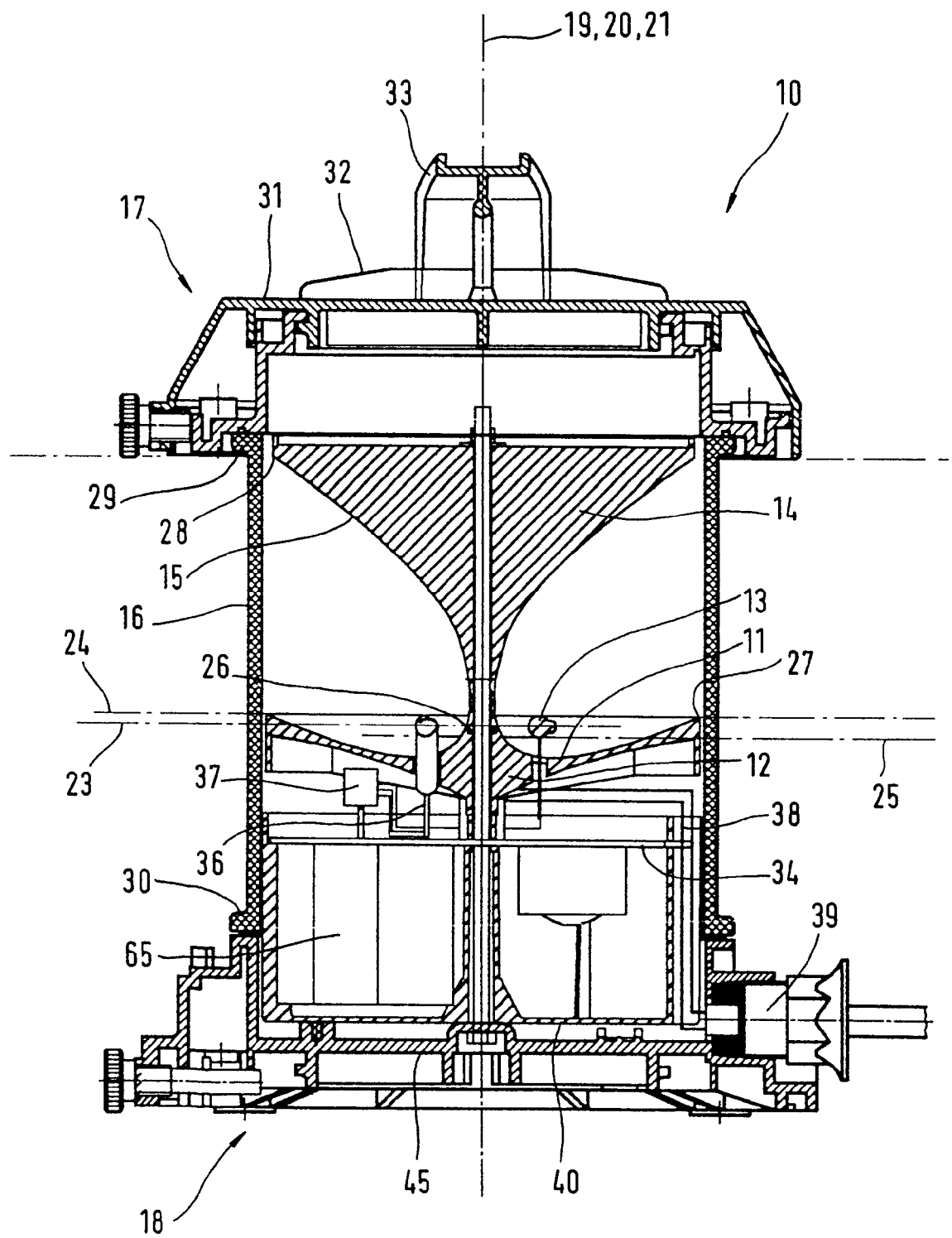
FIG. 1 a vertical section through a luminaire.
Figure 2:
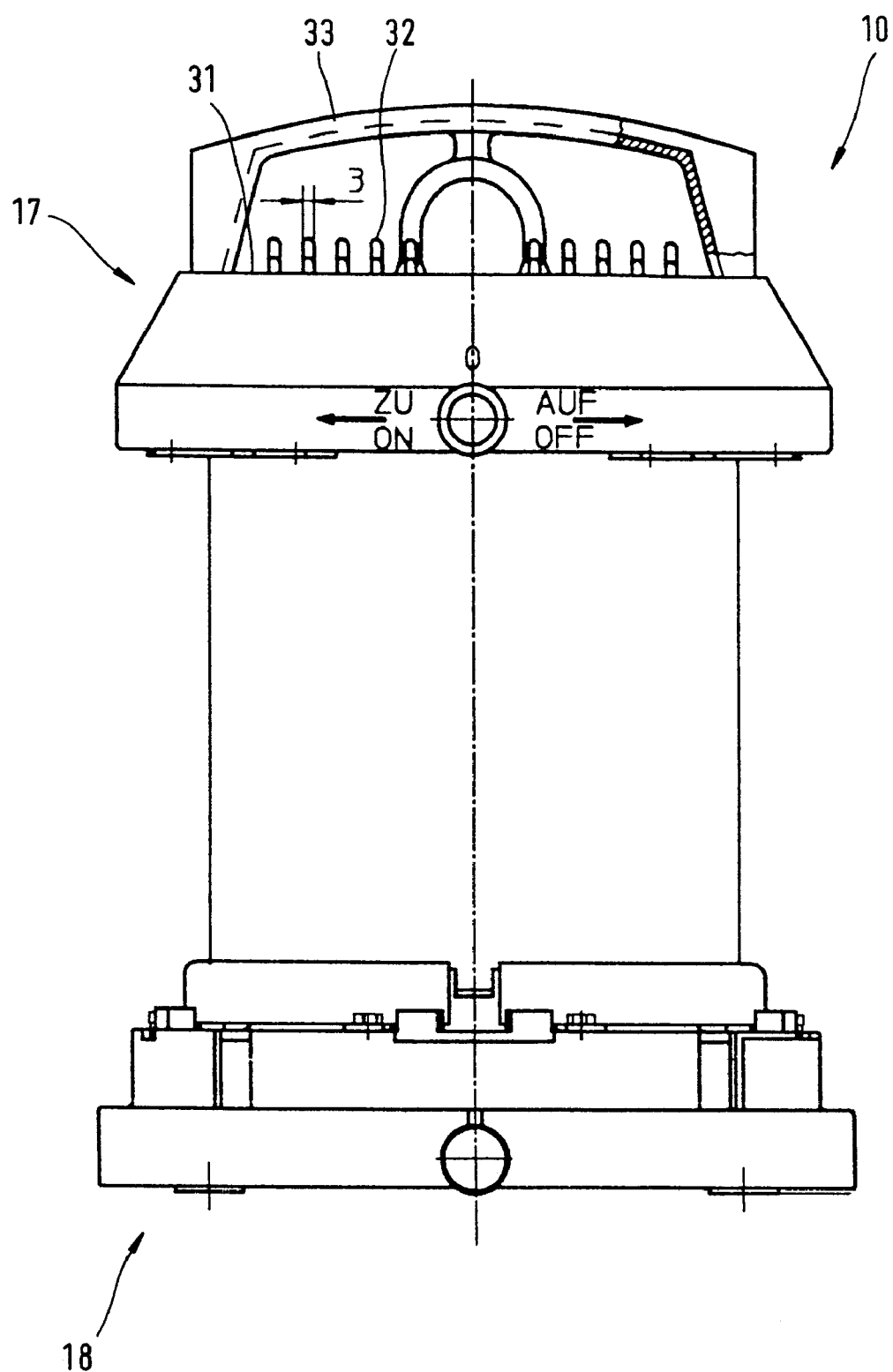
FIG. 2 a side view of the luminaire according to FIG. 1.
Figure 4:
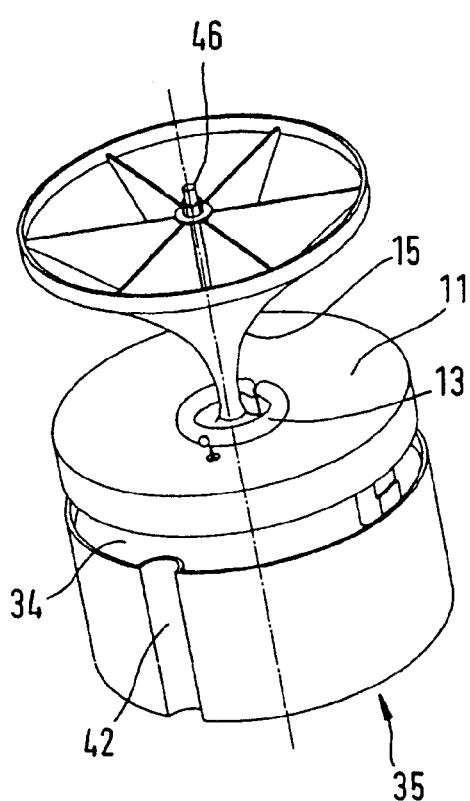

According to FIG. 1, a luminaire 10 has first reflector 12, which is provided with a first reflector surface 11, an annular lighting means 13, a second reflector 14 having a second reflector surface 15, a transparent covering 16, a upper housing part 17 and a lower housing part 18. The last three parts listed form a housing of the luminaire. 10.

The lighting means 13 is a xenon flash lamp, whose annular shape defines a ring axis 19 which runs coaxial to a middle axis 20 of the luminaire 10 and also coaxial to an axis of rotation 21. This results from the circumferential, in particular rotationally symmetric shape of the two reflector surfaces 11 and 15.

The luminaire 10 is usually arranged in the shown upright position with a vertical arrangement of the axes 19, 20, 21, i.e. perpendicular to the earth's surface or some other reference surface.

In the cross-section according to FIG. 1 the first reflector surface 11 runs along a parabola and—continuing along the parabola—merges into the second reflector surface 15. Deviations in the form of the parabola are possible.

The first reflector surface 11, or the first reflector 12, is arranged on one side of the lighting means 13, namely below same. Accordingly, the second reflector surface 15, or the second reflector 14, is arranged opposite thereto, i.e. above the lighting means 13.

Figure 6:
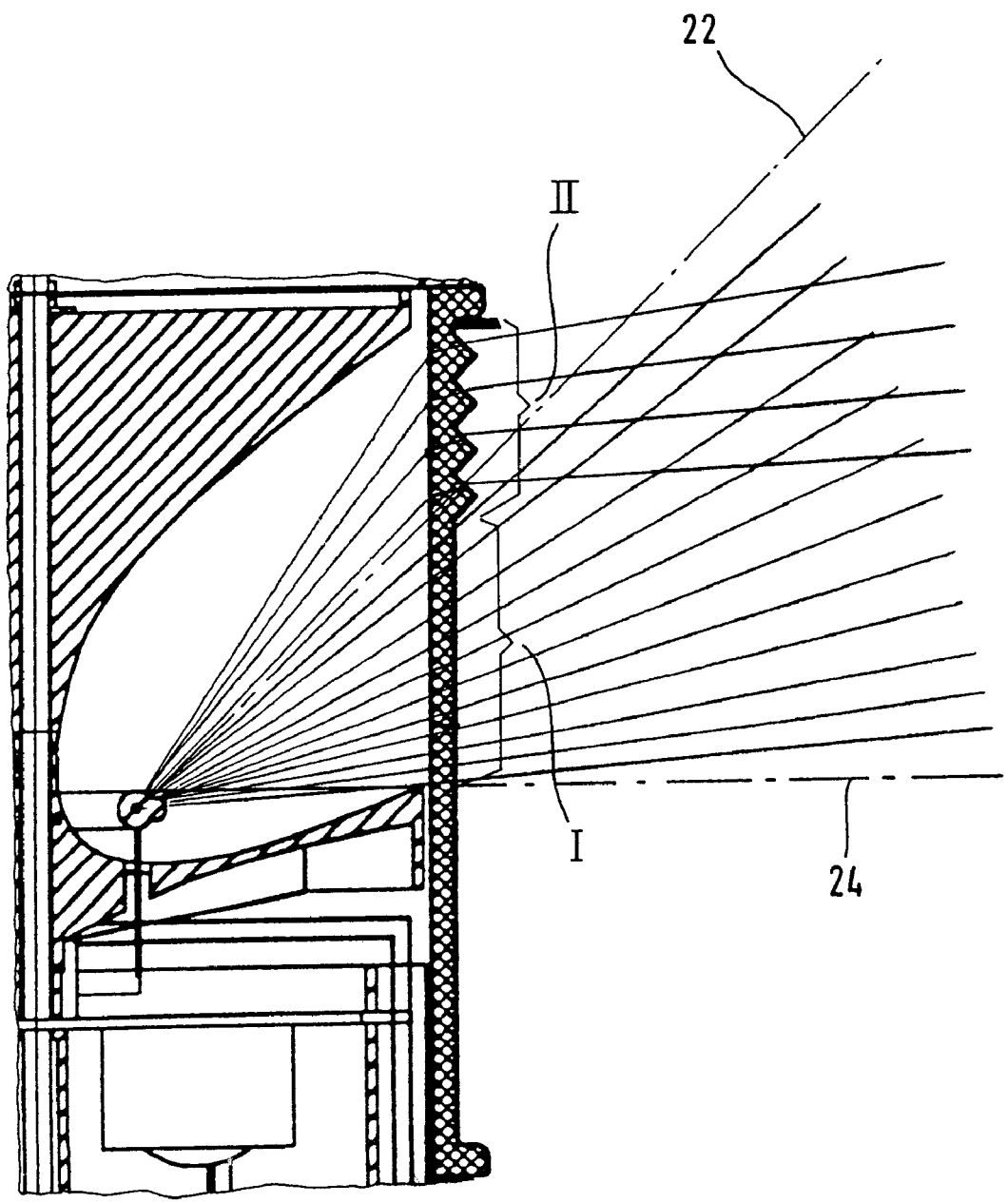

The parabola described by the two reflector surfaces 11, 15 has a parabolic axis which is not pointed in a horizontal direction but is directed upward therefrom by approximately an octant of a circle, in particular by 43°, see FIG. 6.

The lighting means 13 and its arrangement define three planes, namely a lighting means plane running through the middle of the lighting means 13, an upper border plane 24 and a lower border plane 25. The upper border plane 24 is tangent to a circumferential top side of the lighting means 13. Correspondingly, the lower border plane 25 is tangent to a circumferential bottom side of the lighting means 13.

The lighting means 13 is arranged approximately in a focus of a parabola. The latter is formed at least by a part of the reflector surfaces adjacent to the lighting means 13.

The first reflector surface 11 extends from an inner radial border point 26 to an outer radial border point 27. The outer border point 27 lies approximately at the height of the lighting means 13 with respect to the axis of rotation 21, according to FIG. 1 exactly in the upper border plane 24. Consequently, the light emitted directly from the lighting means 13 can be projected only above a horizontal direction. The horizontal direction results from the position of the outer border point 27, which here lies in the upper border plane 24.

The inner border point 26 lies within the lighting means 13 and between the two border planes 24, 25 if at all possible, in FIG. 1 between the lower border plane 25 and the lighting means plane 23. The second reflector surface 15 proceeds from the inner border point 26.

At the same time, the inner border point 26 marks the start of the second (upper) reflector surface 15, which ends far above and radially outside of the lighting means 13 at an outer border point 28. Due to the upwardly tilted parabolic configuration of the mutually connected reflector surfaces 11 and 15, the latter assumes in its space practically a conical form, while the first reflector surface 11 represents a circumferential depression. The conical form of the second reflector 14 tapers in the direction of the first reflector 12, however with its narrowest cross-section not being located at the inner border point 26 but instead at a distance therefrom, in FIG. 1 slightly above the upper border plane 24.

The two reflectors 12, 14 are made of an ozone-resistant polycarbonate and coated in a special manner. The first reflector 12 has particularly good reflecting properties, with a coating as highly polished as possible, in particular chrome-coated, while the second reflector 14 should reflect as little as possible, and is thus provided with a blackened surface or one painted with a dull finish.

The covering 16 is configured as a cylindrical tube and has an interior diameter just large enough to accommodate the first reflector 12. Correspondingly, the outer border point 27 lies close to the covering 16 or at a very slight distance therefrom. The same applies to the outer border point 28 of the second reflector 14. Maintaining a slight distance or none at all helps avoid light scatter. The covering 16 is made of transparent polycarbonate which is as clear as possible.

The cylindrical covering 16 has at its open ends interrupted or circumferential transverse (outwardly directed) webs 29, 30. These lie at the upper housing part 17 and/or lower housing part 18 or are connected to them.

The upper housing part 17 is configured in the manner of a lid and has on its top side 31 cooling fins 32 and a handle 33. The upper housing part can be connected to the covering 16 with a short twisting action, somewhat like that of a bayonet connection.

Contained in the lower housing part 18 and in part in the covering 16 are other components, below the first reflector 12, namely a board 34 with electric and electronic components at least on the underside of the board and a pot-like board housing 35, into which the board 34 is inserted and sealed there. The electronic components are completely embedded in a sealing compound, with the top of the latter being shielded by the board 34 and its sides and bottom being arranged in the board housing 35.

Between the first reflector 12 and the plate 34 there is space for plugs and cables, for the power supply and for connectors of the lighting means 13. The latter has connecting wires 36 which run parallel to the ring axis, through the first reflector 12 and are connected above the board to corresponding electric cables of a power supply 37. The latter is attached by means of a connecting cable 38 to a lead-in 39 in the lower housing part 18. The cable lead-in 39 is arranged on a radial outer side adjacent to the covering 16, approximately at the height of an underside 40 of the board housing 35. The latter has in the region of a circumferential side wall 41 an axial-directed groove 42, which is arranged adjacent to the cable lead-in 39 and in which the connecting cable 38 is lead to the power supply 37 on the board 34.

Second reflector 15, first reflector 12 and board 34 with board housing 35 are connected to each other in a special manner. Provided for this purpose is an axial-directed, centered support, namely a rod 43, which passes through the corresponding axial bores of said components. The rod 43 has at one end a screw head 44, which lies outside on the bottom side 45 of the lower housing part 18. Reflectors 11 and 14 as well as the board housing 35 can therefore be connected to the lower housing part 18 by means of the rod 43. A free end 46 of the rod 43 projects out of the second reflector 14 and is provided with securing means, such as a screw thread with a nut 47 seated on it. By tightening the same, the reflectors 12, 14 and. the board housing 35 are pressed up against the lower housing part 18.

The board housing 35 has a centered, axial-directed sleeve 48 which extends from the bottom side 40 to the board 34. During assembly, the sleeve 48 pushes against a tubular extension 49 lying opposite the first reflector surface 11 (for receiving the rod 43) of the first reflector 12.

Figure 5:
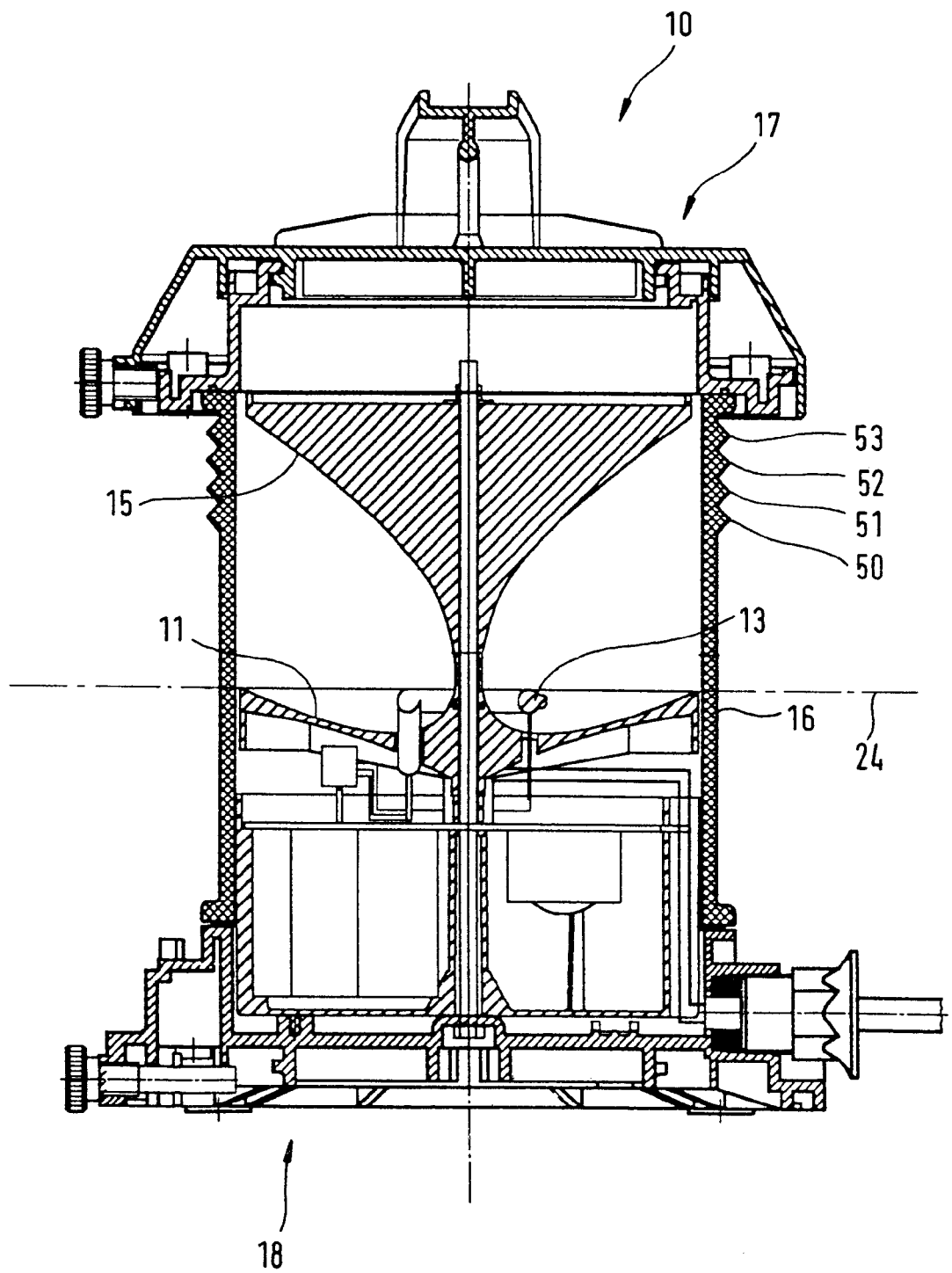
Figure 7:
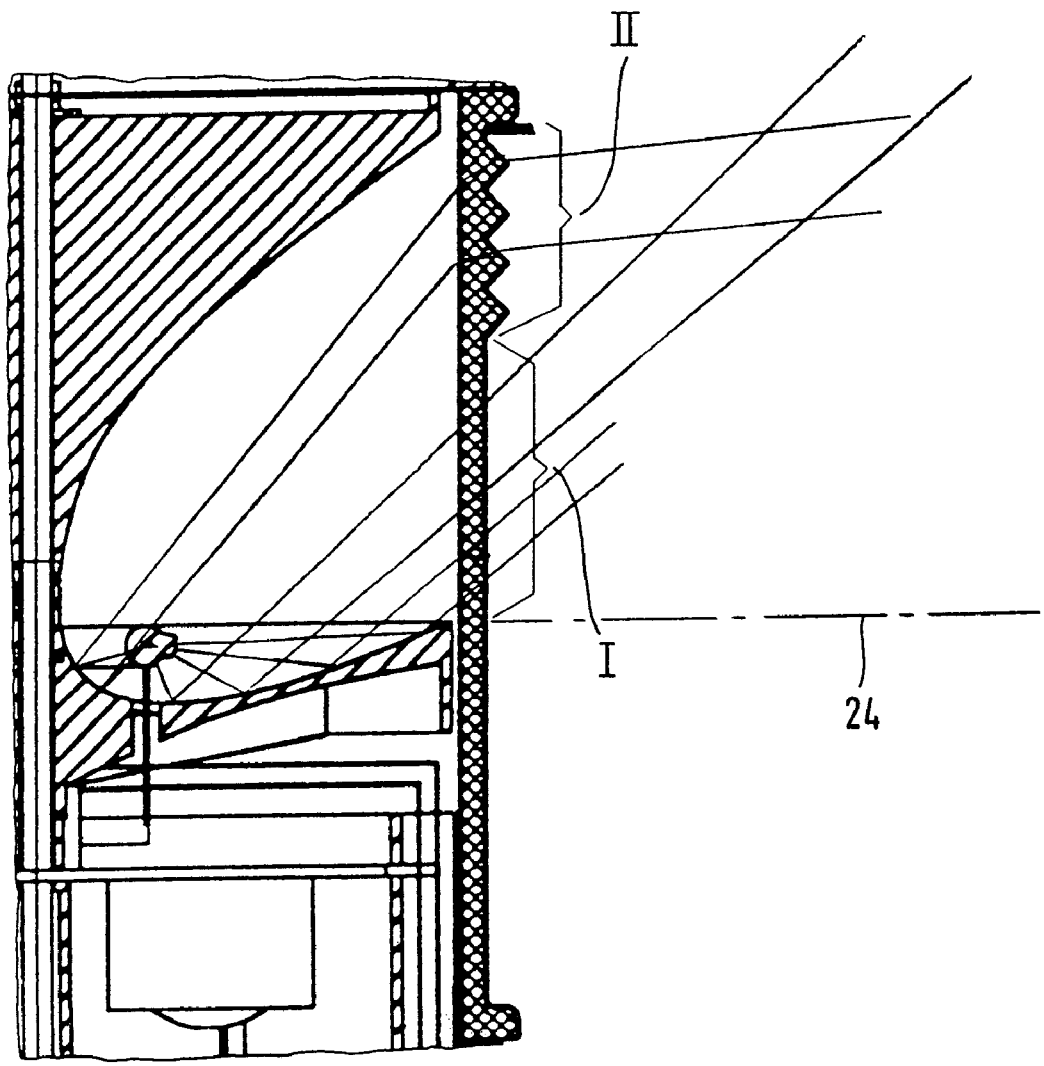

FIG. 5 shows an embodiment modified with respect to that shown in FIG. 1. Pursuant to FIG. 5, the covering 16 has in the vicinity of the upper housing part 17 circumferential prismatic elements, namely prism rings 50, 51, 52, 53. These refract the light in the direction perpendicular to the middle axis 20, see FIGS. 6 and 7. FIG. 6 shows the light beams emitted directly from the lighting means 13. In a region I near the first reflector 12 a conical (sectioned) beam cluster can be seen, whose main direction in an upright luminaire 10 is somewhat above the upper border plane 24.

The prism rings 50–53 form a region II. The light beams emitted from the covering 16 in this region II run practically parallel to the upper border plane 24, so that the portion of horizontally directed light (in an upright luminaire 10) is significantly increased by the prism rings 50–53, namely by deflection of the light beams emitted by the lighting means 13 which in any case are at the greatest angle to the border plane 24.

The light beams reflected by the first reflector 12 are "distributed" in a similar manner. In the lower region I (near the first reflector 12) the light beams are directed markedly upwards with respect to the border plane 24. Light beams directed further upwards pass through the prism rings 50–53 in region II and are deflected in a direction slightly above the border plane 24. As a result, the prism rings 50–53 achieve a significant increase in the light emitted in the vicinity of the border plane 24, in terms of the light emitted directly from the lighting means 13 as well as the light reflected at the first reflector 12. The exact design of the prism rings 50–53—the position of the light-refracting surfaces—depends on the materials employed and conforms to them.

Figure 8:
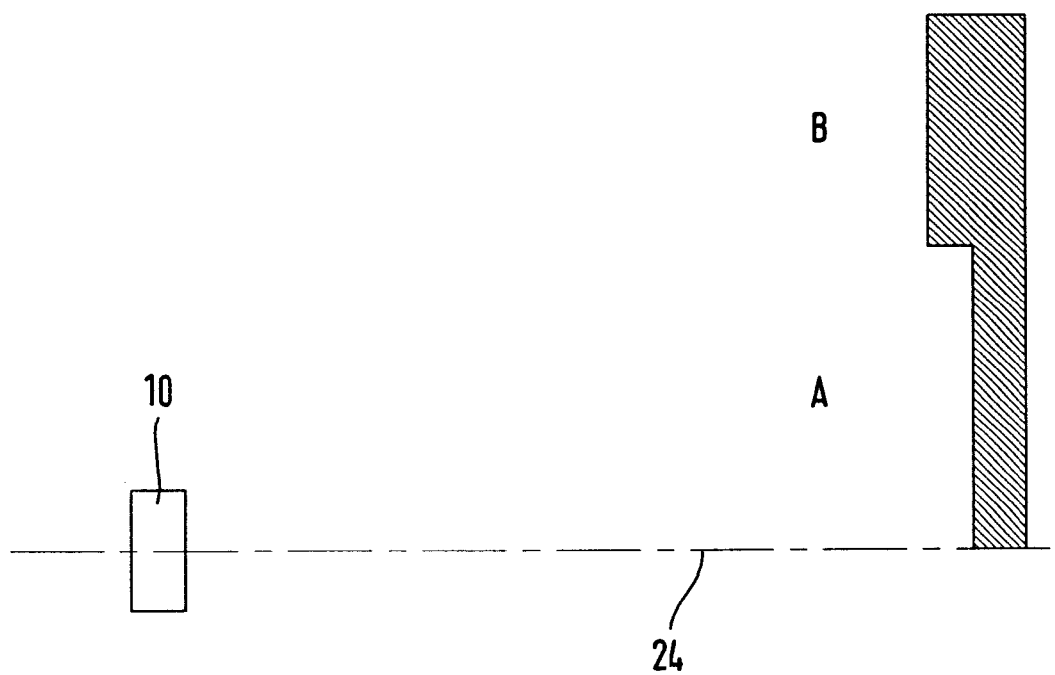
Figure 9:
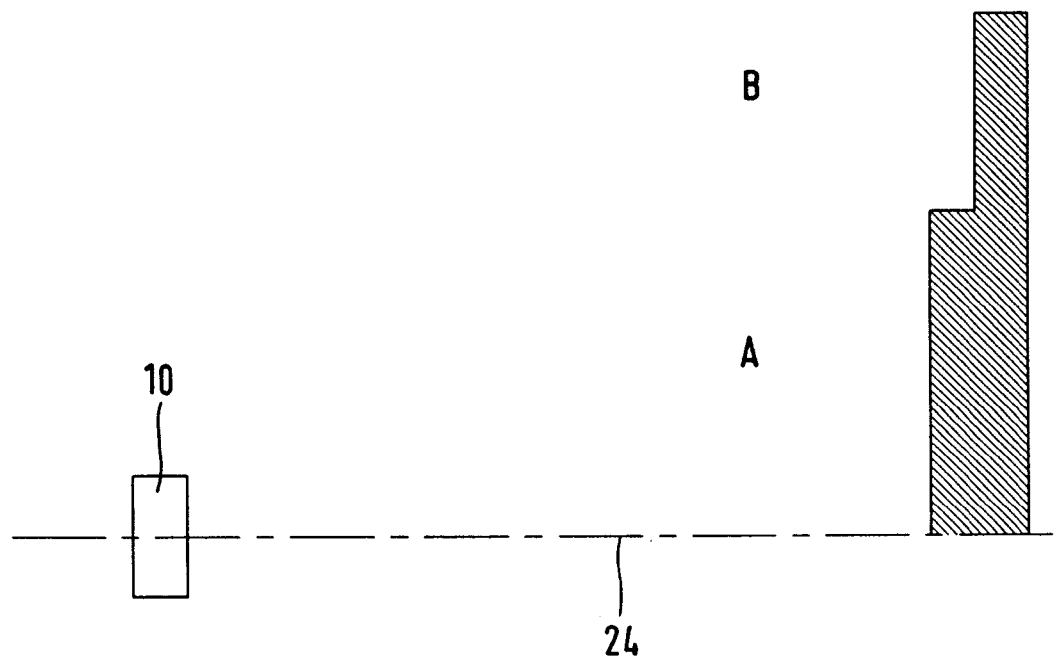

FIGS. 8 and 9 show a qualitative distribution of the light intensities at a distance from the luminaire 10. Here FIG. 8 relates to the embodiment of FIG. 1, and FIG. 9 refers to the embodiment of FIG. 5. Accordingly, the embodiment of FIG. 5 having the prism rings 50–53 at some distance from the luminaire results in a greater light intensity near the upper border edge 24, see section A in FIG. 9, and in a relatively lesser light intensity in the next higher section B.

The light intensity ratios are exactly the opposite in the embodiment according to FIG. 1. There the light intensity is greater in the higher region B than in the region A adjacent to the border plane 24, see FIG. 8. In both embodiments, there is a slow drop in light intensity above the region B, while practically no light is radiated below the border plane 24. At the most, light scatter results in light phenomena in this region. In this respect the non-reflecting, or weakly reflecting, design of the second reflector 14 plays an important role. It is therefore not absolutely necessary that it be parabolic in shape, since hardly any light is reflected, if at all. However, it is important that the second reflector surface 15 extends all the way to the covering 16; otherwise additional light-absorbent elements should be provided to avoid light scatter.

Figure 10:
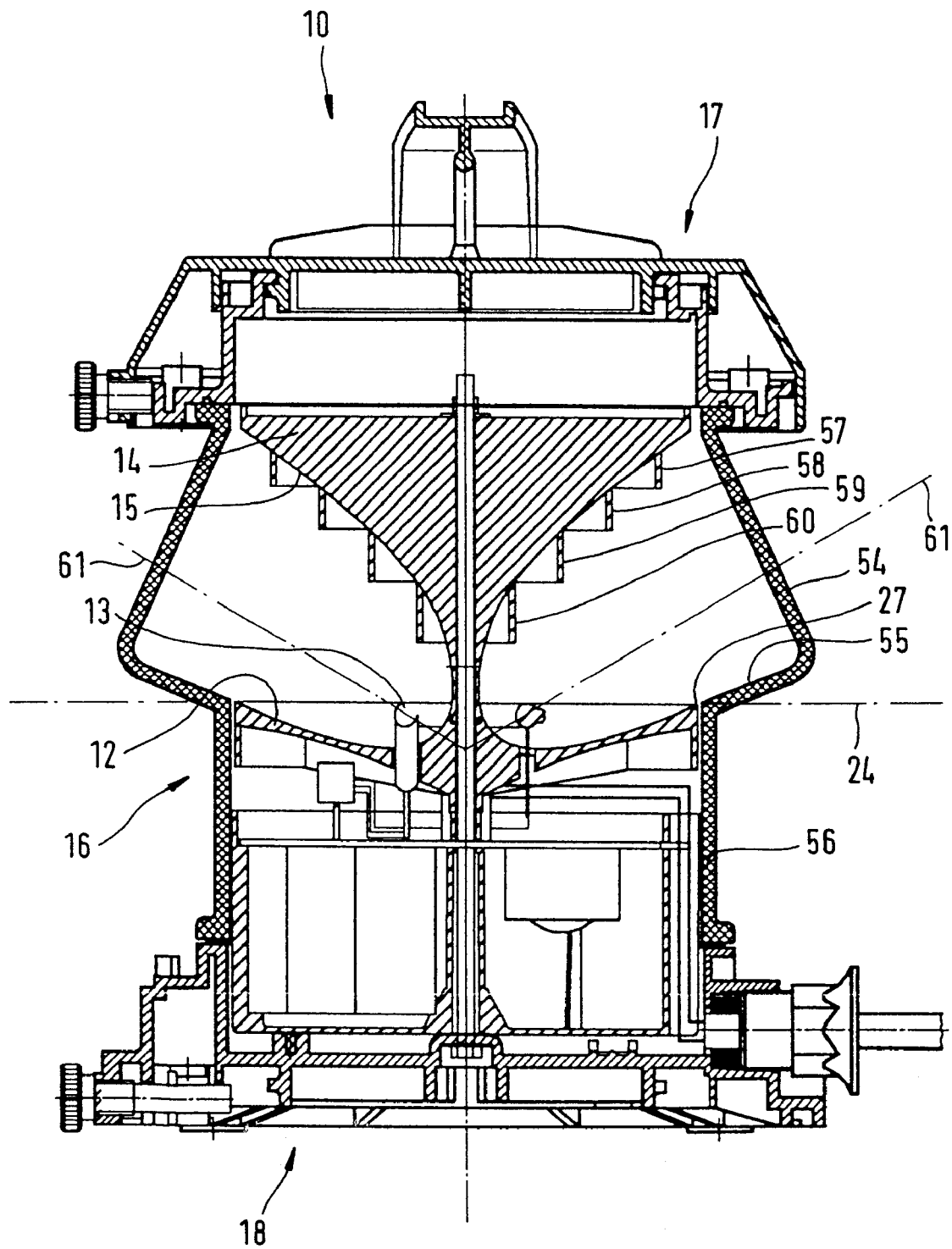

A yet further modified covering 16 is shown in FIG. 10. Near the upper housing part 17 the covering 16 has a conical section with a circumferential main wall 54 whose diameter increases in the direction of the border plane 24. Shortly before reaching the border plane 24 the main wall 54 joins a shoulder 55 which, being directed toward the interior, precisely compensates for the extended diameter of the conical form of the main wall 54 and extends to the outer border point 27. A cylindrical region 56 joins the shoulder 55 in the direction of the lower housing part 18.

A special feature according to FIG. 10 is provided in the region of the second reflector 14. Arranged on its reflector surface 15 are diaphragm rings diaphragm rings 57, 58, 59, 60. Their walls extend in the axial direction and are arranged concentrically with respect to each other. Furthermore, the diaphragm rings 57–60 each have the same height in the axial direction. Correspondingly, this results in a stepped arrangement as shown in FIG. 10. The diaphragm rings 57–60 are coated, in particular blackened, on both sides to reduce reflection as much as possible. The light striking the second reflector surface 15 from the lighting means 13 is held back by the diaphragm rings 57–60 so that the second reflector 14 reflects even less light than in the embodiments of FIGs. 1 and 7. Also possible is the substitution of the second reflector 14 by appropriately configured diaphragm rings 57–60.

The conical shape of one part of the covering 16 in FIG. 10 lowers the amount of scattered light since the main wall 54 is arranged approximately perpendicular to a main direction of the light emitted from the lighting means 13 and from the first reflector 12. The main direction is suggested in FIG. 10 by an axis 61.

Figure 12:
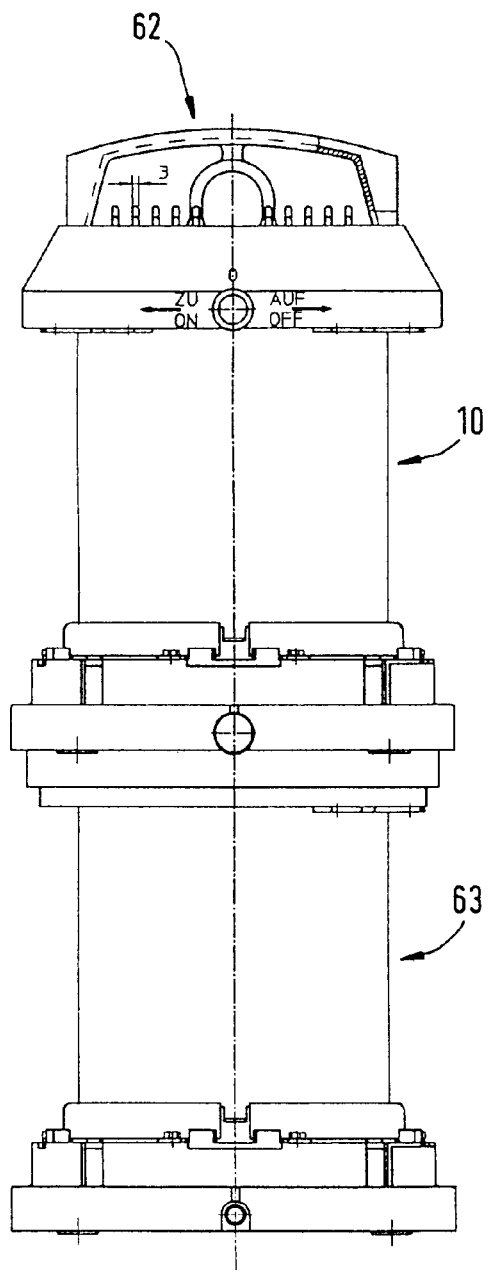
Figure 11:
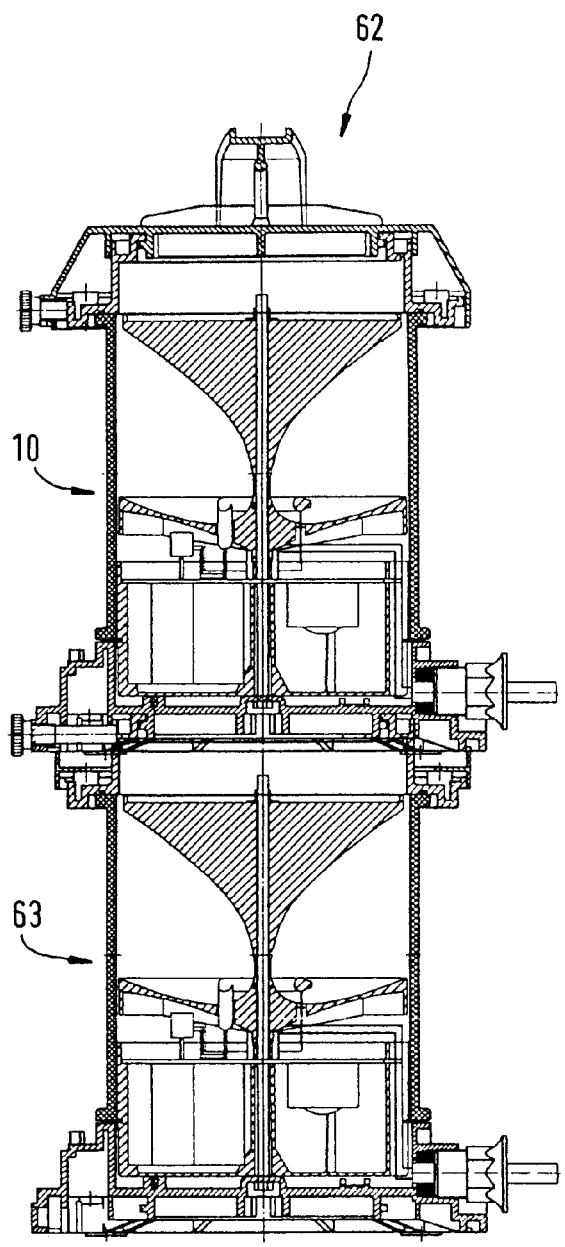

A lighting installation 62 having two luminaires 10 and 63 arranged one above the other is shown in FIGS. 11 and 12. The luminaire 10 here corresponds to the embodiment according to FIG. 1. Modifications according to the alternative embodiments described above are possible. A luminaire 10 is approximately 32 cm in height. The lighting installation 62 attains a height of approximately 55 cm.

An upper housing part 64 of the lower luminaire 63 has a somewhat different and simplified configuration than the upper housing part 17 of the upper luminaire 10. The objective is to achieve a simple connection between the upper housing part 64 of the lower luminaire 63 and the lower housing part 18 of the upper luminaire 10. Also provided here is preferably a connection made by insertion and/or twisting together of the luminaires 10, 63.

In practice, the upper luminaire 10 emits red light as a night marker, while the lower luminaire 63 emits white light as a day marker.

Figure 3:
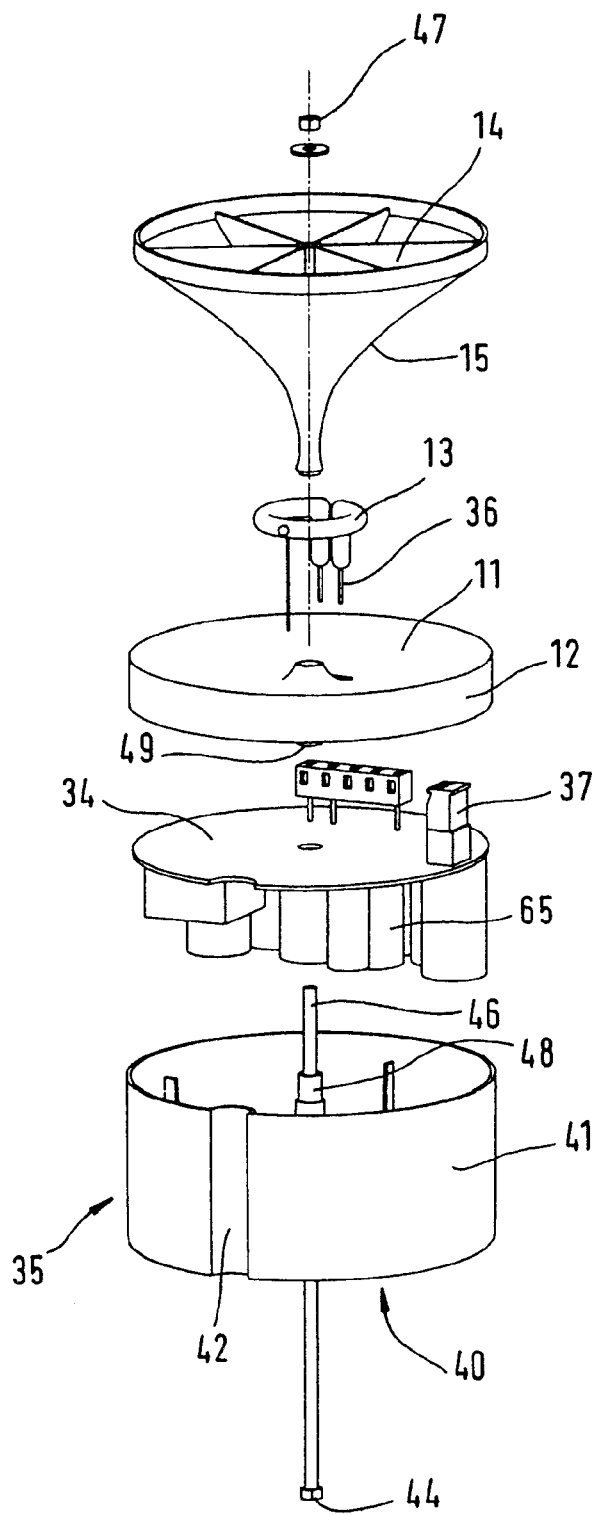
FIG. 3 an exploded view of components arranged inside the luminaire according to FIG. 1, FIG. 4 the components according to FIG. 3 in their assembled view, FIG. 5 a vertical section through a luminaire similar to FIG. 1 but with a modified covering, FIG. 6 a part of the beam trajectory of the luminaire according to FIG. 5, FIG. 7 another part of the beam trajectory of the luminaire according to FIG. 5, FIG. 8 a qualitative representation of luminous intensity at a certain distance from the luminaire for the embodiment according to FIG. 1, FIG. 9 a qualitative representation similar to FIG. 8, but for the embodiment of FIG. 7, FIG. 10 a further modification of the luminaires shown in FIGS. 1 and 7, FIG. 11 vertical section of two luminaires joined one over the other to form a unit, FIG. 12 a side view of the embodiment according to FIG. 11, FIG. 13 a wind-rotary installation with a lighting installation according to the invention.

Another special feature exists with respect to the electronics provided for each luminaire 10, 63, also with respect to the previously described embodiments. The flash lamp employed as the lighting means 13 makes two short flashes in quick succession. The interval between these two flashes is so short that—due to the inertia of the human eye—only one flash can be perceived optically. At the most, the two immediately successive flashes can be perceived only when standing in the immediate vicinity and with full concentration. The electronics sealed in the board housing 35 include a number of capacitors 65, see FIG. 1 and FIG. 3. These are controlled such that successive partial loads are conducted. Preferably the capacitors 65 are switched such that all capacitors are discharged step-by-step at the same time.

Figure 13:
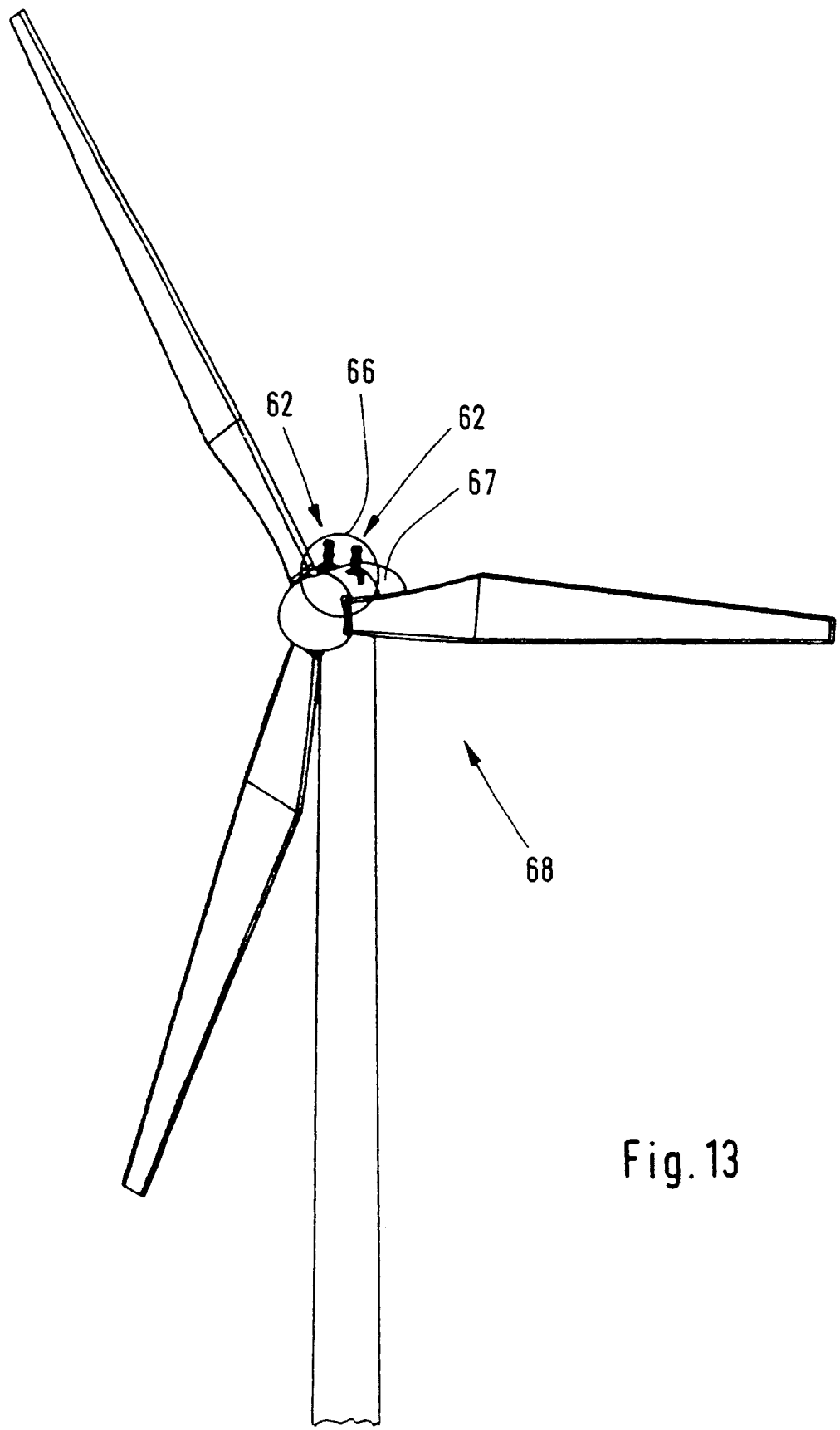

FIG. 13 shows the arrangement of a group 66 of two lighting installation 62 according to the invention as disposed on a hub 67 of a wind rotor. 68. Here two lighting installations are provided in order to ensure a visible flashing signal at every position of the rotor blades. In its most elementary embodiment a lighting installation comprises a single luminaire.

List of Designations

10 luminaire
11 first reflector surface
12 first reflector
13 lighting means
14 second reflector
15 second reflector surface
16 covering
17 upper housing part
18 lower housing part
19 ring axis
20 middle axis
21 axis of rotation
22 parabolic axis
23 lighting means plane
24 upper border plane
25 lower border plane
26 inner border point
27 outer border point
28 outer border point
29 web
30 web
31 top side
32 cooling fin
33 handle
34 board
35 board housing
36 wires
37 power supply
38 connecting cable
39 cable lead-in
40 bottom side
41 side wall
42 groove
43 rod
44 screw head
45 bottom side
46 end
47 nut
48 sleeve
49 extension
50 prism ring
51 prism ring
52 prism ring
53 prism ring
54 main wall
55 shoulder
56 cylindrical region 57 diaphragm ring
58 diaphragm ring
59 diaphragm ring
60 diaphragm ring
61 main direction
62 lighting installation
63 luminaire
64 upper housing part
65 capacitors
66 group
67 hub
68 wind rotor
I light emission region
II light emission region
A region of varying light intensity
B region of varying light intensity

What is claimed is:

1. Lighting installation, in particular as a danger light, obstruction light or daytime and nighttime marker, having at least one luminaire (10, 63), with at least one lighting means (13) being arranged in a housing, wherein:
   a) the lighting means (13) is in the form of a ring or part of a ring and defines a ring axis (19),
   b) the lighting means (13) is assigned at least a first reflector surface (11), which encircles entirely or partially an axis of rotation (21),
   c) the ring axis (19) and the axis of rotation (21) run essentially parallel to or coaxially to each other, and
   d) the first reflector surface (11) is arranged essentially below the lighting means (13), with an outer circumferential border (27) of the reflector surface (11) lying in a border plane (24) that runs through the lighting means (13) or slightly outside of the lighting means.

2. Lighting installation according to claim 1, wherein the first reflector surface (11) is of concave form in relation to the lighting means (13).

3. Lighting installation according to claim 2, wherein the first reflector surface (11) is at least partially parabolic in form in its cross-section parallel to the axis of rotation (21) and tangential thereto.

4. Lighting installation according to claim 3, wherein the lighting means (13) is arranged at a focus of the at least partially parabolic first reflector surface (11).

5. Lighting installation according to claim 1, wherein the first. reflector surface (11) is configured and the lighting means (13) is arranged such that the light emitted by the lighting is directed only into a space adjacent or above a defined plane arranged perpendicular to the axis of rotation (21).

6. Lighting installation according to claim 1, wherein the first reflector surface (11) has an inner circumferential border (26) which runs near a border plane(25) at an underside of the lighting means (13).

7. Lighting installation according to claim 1, further comprising a second reflector surface (15) that lies opposite the first reflector surface (11) relative to the lighting means.

8. Lighting installation according to claim 1, wherein the first reflector surface and the second reflector surface (15) are at least partially parabolic in shape.

9. Lighting installation according to claim 1, comprising a plurality of LED lamps serving as lighting means that are arranged in an annular row.

10. Lighting installation according to claim 1, comprising a circumferential, cylindrical, transparent covering disposed as closely as possible to an outer circumferential border (27) of the first reflector surface (11).

11. Lighting installation according to claim 10, wherein the covering (16) has light-refracting elements in at least one circumferential region.

12. Lighting installation according to claim 1, comprising a circumferential, conical, transparent covering (16) having a circumferential main wall (54), whose diameter increases in the direction toward the lighting means (13) and having a shoulder (52) joined to the inner side at the greatest diameter of the main wall (54) and extending in the direction of the first reflector surface (11).

13. Wind-rotor installation having a lighting installation according to claim 1.

14. Lighting installation, in particular as a danger light, obstruction light or daytime and nighttime marker, having at least one luminaire (10, 63), with at least one lighting means (13) being arranged in a housing, wherein:
   a) the lighting means (13) is in the form of a ring or part of a ring and defines a ring axis (19),
   b) the lighting means (13) is assigned a first reflector surface (11), which encircles entirely or partially an axis of rotation (21),
   c) the ring axis (19) and the axis of rotation (21) run essentially parallel to or coaxially to each other, and
   d) the lighting means is assigned a second reflector surface (15), which lies opposite the first reflector surface (11) relative to the lighting means (13), and the second reflector surface (15) has a significantly poorer reflecting quality relative to the first reflector surface (11).

15. Lighting installation, in particular as a danger light, obstruction light or daytime and nighttime marker, having at least one luminaire (10, 63), with at least one lighting means (13) being arranged in a housing, wherein:
   a) the lighting means (13) is in the form of a ring or part of a ring and defines a ring axis (19),
   b) the lighting means (13) is assigned at least a first reflector surface (11), which encircles entirely or partially an axis of rotation (21),
   c) the ring axis (19) and the axis of rotation (21) run essentially parallel to or coaxially to each other, and
   d) the lighting means (13) can be displaced relative to the first reflector surface (11) and parallel to the ring axis (19) or axis of rotation (21).

16. Lighting installation, in particular as a danger light, obstruction light or daytime and nighttime marker, having at least one luminaire (10, 63), with at least one lighting means (13) being arranged in a housing, wherein:
   a) the lighting means (13) is in the form of a ring or part of a ring and defines a ring axis (19),
   b) the lighting means (13) is assigned a first reflector surface (11), which encircles entirely or partially an axis of rotation (21),
   c) the ring axis (19) and the axis of rotation (21) run essentially parallel to or coaxially to each other, and
   d) the lighting means is assigned a second reflector surface (15), which lies opposite the first reflector surface (11) relative to the lighting means (13), and the second reflector surface (15) is provided with diaphragms which keep the reflected light from being emitted in the direction perpendicular to the axis of rotation (21).

17. Lighting installation according to claim 1, wherein the light emitted from the lighting means (13) strikes the first reflector (12), is emitted directly from the luminaire (10) or strikes other parts of the luminaire housing, said other parts having means for preventing a reflection of the light.

18. Lighting installation, in particular as a danger light, obstruction light or daytime and nighttime marker, having at least one luminaire (10, 63), with at least one lighting means (13) being arranged in a housing, wherein:

a) the lighting means (13) is in the form of a ring or part of a ring and defines a ring axis (19), b) the lighting means (1913) is assigned at least a first reflector surface (11), which encircles entirely or partially an axis of rotation (21), c) the ring axis (19) and the axis of rotation (21) run essentially parallel to or coaxially to each other, and d) comprising a support which bears the first reflector surface (11), a board (34) for receiving electric components, and a housing for receiving the board.

\* \* \* \* \*